(12) United States Patent
Daffner et al.

(10) Patent No.: US 12,512,717 B2
(45) Date of Patent: Dec. 30, 2025

(54) PRESSURE COMPENSATION MODULE AND MOTOR VEHICLE DRIVE UNIT HAVING SUCH A PRESSURE COMPENSATION MODULE

(71) Applicant: Bayerische Motoren Werke Aktiengesellschaft, Munich (DE)

(72) Inventors: Markus Daffner, Munich (DE); Bernhard Maier, Bruckberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 260 days.

(21) Appl. No.: 18/562,887

(22) PCT Filed: Feb. 17, 2023

(86) PCT No.: PCT/EP2023/053996
§ 371 (c)(1),
(2) Date: Nov. 21, 2023

(87) PCT Pub. No.: WO2023/169800
PCT Pub. Date: Sep. 14, 2023

(65) Prior Publication Data
US 2024/0266901 A1 Aug. 8, 2024

(30) Foreign Application Priority Data
Mar. 11, 2022 (DE) ...................... 10 2022 105 756.9

(51) Int. Cl.
*H02K 5/10* (2006.01)
*F16H 57/027* (2012.01)
*F16H 57/02* (2012.01)

(52) U.S. Cl.
CPC .............. *H02K 5/10* (2013.01); *F16H 57/027* (2013.01); *F16H 2057/02034* (2013.01); *F16H 2057/02043* (2013.01); *H02K 2205/09* (2013.01)

(58) Field of Classification Search
CPC .... H02K 5/10; H02K 2205/09; F16H 57/027; F16H 2057/02034; F16H 2057/02043;
(Continued)

(56) References Cited

U.S. PATENT DOCUMENTS

| | | | |
|---|---|---|---|
| 2004/0103656 A1* | 6/2004 | Frazer | F15B 1/024 60/414 |
| 2021/0095752 A1* | 4/2021 | Hensel | B60K 1/00 |
| 2021/0215222 A1 | 7/2021 | Battlogg | |

FOREIGN PATENT DOCUMENTS

| | | |
|---|---|---|
| DE | 10 2008 046 446 A1 | 3/2010 |
| DE | 10 2011 012 642 A1 | 8/2012 |

(Continued)

OTHER PUBLICATIONS

DE102008046446A1 English translation (Year: 2025).*
(Continued)

*Primary Examiner* — Christopher M Koehler
*Assistant Examiner* — Viswanathan Subramanian
(74) *Attorney, Agent, or Firm* — Crowell & Moring LLP

(57) ABSTRACT

A pressure compensation module includes a first pressure chamber having a first displacer device with a first displacer internal volume. A second pressure chamber includes a second displacer device with a second displacer internal volume. An intermediate space between the first pressure chamber and the first displacer device is a first compensation volume. An intermediate space between the second pressure chamber and the second displacer device is a second compensation volume. The first compensation volume is fluidically connected to environment surrounding the first pressure chamber by a first compensation connection. The second compensation volume is fluidically connected to environment surrounding the second pressure chamber by a second compensation connection. The first displacer internal volume is fluidically connected to the second compensation volume by a first internal volume connection. The second displacer internal volume is fluidically connected to the first compensation volume by a second internal volume connection.

7 Claims, 2 Drawing Sheets

(58) Field of Classification Search
CPC ........ F16J 3/02; F16J 3/04; F16J 3/041; F16J 3/047; F16J 3/06
USPC .......................................................... 310/88
See application file for complete search history.

(56) References Cited

FOREIGN PATENT DOCUMENTS

| DE | 10 2008 046 446 B4 | 4/2014 | | |
|---|---|---|---|---|
| DE | 10 2012 220 368 A1 | 5/2014 | | |
| EP | 1419911 A2 * | 5/2004 | ............. | B60G 11/30 |
| WO | WO 2018/154112 A1 | 8/2018 | | |

OTHER PUBLICATIONS

DE102011012642A1 English translation (Year: 2025).*
EP1419911A2 English translation (Year: 2025).*
International Search Report (PCT/ISA/210) issued in PCT Application No. PCT/EP2023/053996 dated Apr. 26, 2023 with English translation (4 pages).
German-language Written Opinion (PCT/ISA/237) issued in PCT Application No. PCT/EP2023/053996 dated Apr. 26, 2023 with English translation (9 pages).
German-language Search Report issued in German Application No. 10 2022 105 756.9 dated Sep. 27, 2022 with partial English translation (5 pages).
German-language Office Action issued in German Application No. 10 2022 105 756.9 dated Nov. 16, 2022 (5 pages).

* cited by examiner

PRESSURE COMPENSATION MODULE AND MOTOR VEHICLE DRIVE UNIT HAVING SUCH A PRESSURE COMPENSATION MODULE

BACKGROUND AND SUMMARY

DE 10 2012 220 368 A1 discloses a drive unit for a motor vehicle, which has an electric drive machine and a transmission device for transmitting driving forces from this drive machine, the drive machine and the transmission device being arranged in a housing device.

This disclosure is described below in conjunction with a motor vehicle drive unit of an electrically driveable motor vehicle. However this should not be understood as a restriction of the disclosure to this use. In motor vehicles having an electrified drive, the electromechanical energy transducer, which is provided for driving the motor vehicle (drive machine), and the transmission provided for transmitting the driving forces supplied by this drive machine, are arranged in a spatial vicinity to each other. Such an arrangement gives rise, in a common drive housing, in which the drive machine and the transmission device are arranged, to two spaces which are separated from each other by way of a seal, in particular to prevent a transfer of transmission lubricant from the transmission device into the space in which the drive machine is arranged. During operation of the drive unit, pressure differences may load or strain this seal.

Against the background set forth above, it is an object of the present disclosure to permit a pressure compensation function without fluidically connecting the two relevant spaces to each other. This object is achieved by a pressure compensation module, and by a motor vehicle drive unit having such a pressure compensation module.

A pressure compensation module within the meaning of the disclosure should be understood as meaning an apparatus which is to permit pressure compensation, or pressure equalization, at least in a certain range, between two spaces which are in particular delimited from each other at least by means of a seal, in particular two partial spaces in a machine housing. These two partial spaces can be geometrically arranged, in particular directly adjacent to each other, or spaced apart from each other and not directly adjacent.

To provide this functionality, the pressure compensation module has a first pressure chamber. Within the meaning of the disclosure, a pressure chamber should be understood as meaning a housing region of the pressure compensation module with an interior space. Furthermore, a first displacement device is at least partially or preferably completely accommodated in this first pressure chamber. This first displacement device has a first displacement interior volume. In addition to the first pressure chamber, the pressure compensation module also has a second pressure chamber, and a second displacement device having a second displacement interior volume is arranged in this second pressure chamber, it being possible for the first and the second displacement device to be designed as identical parts or preferably as two differing components.

Visually, these displacement devices are each accommodated in the pressure chambers (first displacement device-first pressure chamber/second displacement device-second pressure chamber) and a first intermediate space is thus produced in the first pressure chamber between the latter and the first displacement device because the first displacement device does not completely, at least does not completely permanently, fill the first pressure chamber. Furthermore, a second intermediate space is produced in the second pressure chamber between the latter and the second displacement device because the second displacement device does not completely, at least does not completely permanently, fill the second pressure chamber. An intermediate space between the first pressure chamber and the first displacement device should be considered to be a first compensation volume, while an intermediate space between the second pressure chamber and the second displacement device should be considered to be a second compensation volume.

Furthermore, the first compensation volume is connected in a fluid-conducting manner by a first compensation connection to an environment surrounding the first pressure chamber. The first compensation connection can be designed as a clearance in the first pressure chamber such that air from the environment surrounding the first pressure chamber can enter into and exit from the first pressure chamber and therefore into/from the first compensation volume. Furthermore, the second compensation volume is connected in a fluid-conducting manner by a second compensation connection to an environment surrounding the second pressure chamber. Air from an environment surrounding the second pressure chamber can flow into and out of the second pressure chamber and therefore into/out of the second compensation volume.

Furthermore, the first displacement interior volume is connected in a fluid-conducting manner by a first interior volume connection to the second compensation volume or is at least temporarily connectable thereto, and, furthermore, the second displacement interior volume is connected in a fluid-conducting manner by a second interior volume connection to the first compensation volume or is at least temporarily connectable thereto. In particular, by way of such a configuration, pressure compensation can be achieved with the pressure compensation module since, to this extent, a pressure effective at the second compensation connection, and therefore a pressure prevailing in the second compensation volume, is greater than a pressure effective at the first compensation connection, and therefore a pressure effective in the first compensation volume. Therefore, the second displacement device expands and reduces the second compensation volume, or the first displacement device contracts and the first compensation volume is increased, and a correspondingly reverse behavior arises for the reverse pressure conditions. Furthermore, preferably, the mutual influencing via the expansion behavior of the displacement devices with respect to each other can be additionally influenced.

In a preferred embodiment of the disclosure, at least one of the two displacement devices or both has or have an expansion bellows. This at least one expansion bellows is configured in such a manner that it changes its size in the event of the pressure conditions for which it is designed, and the behavior explained above thus occurs. Such an expansion bellows surrounds or encloses a certain volume which correspondingly changes as the size of the expansion bellows changes, and, furthermore, this volume which is in each case located in the expansion bellows should be considered to be the respective displacement interior volume. In particular, an expansion bellows is known from the art as a device for changing its volume, and in particular, its interior volume, and therefore an operationally reliable pressure compensation module can be provided using at least one expansion bellows.

In a preferred embodiment of the disclosure, at least one of the two displacement devices, or both, comprises an expandable reservoir bladder, or is formed as, or has, or have such an expandable reservoir bladder as a constituent part.

Furthermore, preferably, such an expandable reservoir bladder surrounds a certain volume which changes as the reservoir bladder expands. This volume can be considered to be a displacement interior volume. In particular, a configuration with an expandable reservoir bladder opens up great scope for the design of the pressure chamber in which the reservoir bladder is accommodated.

In a preferred embodiment of the disclosure, the pressure compensation module has a ventilator device. The ventilator device is arranged on the pressure compensation module in such a manner that ventilation of at least one of the two compensation volumes (first compensation volume, second compensation volume) is made possible. Preferably, at least one of the compensation volumes is connected in a fluid-conducting manner by way of the ventilator device to the environment surrounding the pressure compensation module.

Furthermore, an aspect of this disclosure relates to a motor vehicle drive unit (i.e. a unit for supplying driving power (rotational speed, torque) for overcoming driving resistances (acceleration resistance, slope resistance, air resistance, frictional resistance)) of a motor vehicle, preferably a passenger motor vehicle. The motor vehicle drive unit has in particular an electromechanical energy converter which can be considered to be an electric drive machine. In particular, this electric drive machine is provided for converting electrical power (voltage, current) into mechanical power (rotational speed, torque). The electric drive machine is arranged structurally in an electric motor housing interior space, and is therefore at least partially or else at least substantially surrounded by a housing. A traction transmission is provided to adapt the driving power (rotational speed, torque) output by the electric drive machine. Furthermore, the traction transmission for transmitting power is connected at least by a drive shaft to the electric drive machine.

The traction transmission is arranged structurally in a traction transmission interior space, or is at least substantially accommodated therein. Furthermore, preferably, this electric motor housing interior space and this traction transmission interior space are arranged in a common drive machine housing device, these two interior spaces being substantially separated from each other by at least one transmission wall. In particular, the traction transmission has lubrication and/or cooling by means of a preferably liquid medium, preferably by a transmission lubricant. Furthermore, preferably, the electric drive machine is arranged completely or partially in a dry space, or has a cooling and/or lubrication management system separated from the traction transmission. In particular, in a configuration in which the traction transmission is supplied by way of a liquid transmission lubricant, and in which the electric drive machine is supplied differently therefrom or not with a liquid lubricant, separation of the electric motor housing interior space and the traction transmission interior space should be provided, in particular in order to prevent lubricant from passing out of the traction transmission into the electric drive machine. Furthermore, a pressure difference between these two spaces should be avoided or should be reduced since a positive pressure in the traction transmission interior space in relation to the electric motor housing interior space may promote transfer of the lubricant. The traction transmission interior space can be considered to be what is referred to as a wet space, because of the lubrication of the traction transmission. Furthermore, the electric motor housing interior space can be considered to be what is referred to as a dry space. The electric motor housing interior space can be arranged directly adjacent to the traction transmission interior space or, preferably, the (dry) electric motor housing interior space, in an embodiment in which at least one rotor or a stator of the electric drive machine (or both) can be temperature-controlled by a liquid medium during their operation, can be arranged spaced apart from the traction transmission interior space and not directly adjacent thereto. In particular, voltage-conducting or electronic power components can be arranged in this (dry) electric motor housing interior space.

Furthermore, a pressure compensation module may be provided in this motor vehicle drive unit, wherein the first compensation volume is connected in a fluid-conducting manner to the electric motor housing interior space, or is at least temporarily connectable thereto, and wherein the second compensation volume is connected in a fluid-conducting manner to the traction transmission interior space, or is at least temporarily connectable thereto. In particular, in the event of a pressure ($p_{GBX}$) prevailing in the traction transmission interior space that is greater than the pressure ($p_{EMA}$) prevailing in the electric motor housing interior space, such a configuration leads to an expansion of the first displacement device, to a reduction in size of the second displacement device, and therefore, to a reduction in the pressure difference between these two spaces, the two spaces not being connected to each other by the pressure compensation module in such a manner that media can be exchanged between the two spaces via the pressure compensation module. To the contrary, these spaces remain fluidically separated from each other, in particular, by way of the pressure compensation module.

In a preferred embodiment, the pressure compensation module is arranged at least partially or completely in the traction transmission interior space, or in the electric motor housing interior space. Preferably, the pressure compensation module is accommodated in a housing wall which, at least partially, separates the electric motor housing interior space from the traction transmission interior space. In particular, by way of such a configuration, particularly little installation space can be required since the pressure compensation module is accommodated in the common housing device of the electric drive machine and traction transmission.

In a preferred embodiment, the pressure compensation module is arranged completely outside the traction transmission interior space and the electric motor housing interior space. Preferably, the pressure compensation module is at least partially or preferably completely arranged on an outer surface of a common housing device in which both the electric drive machine and the traction transmission are accommodated. In particular, in the case of such a configuration, the pressure compensation module is easily accessible and can be easily maintained or exchanged.

BRIEF DESCRIPTION OF THE DRAWINGS

Individual features of the disclosure and embodiments of the disclosure are explained in more detail below with reference to the embodiments illustrated in the figures, with other than the illustrated combinations of features also being possible, without parting from the present disclosure.

DETAILED DESCRIPTION OF THE DRAWINGS

Figure 1:
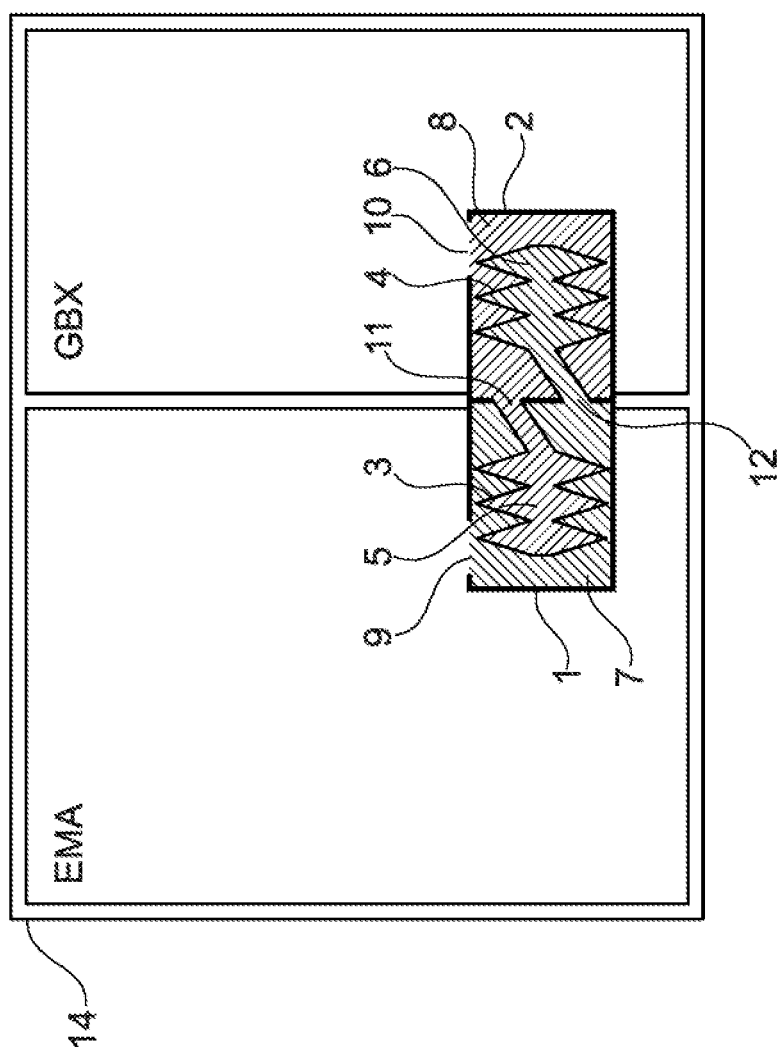
FIG. 1 shows a schematic of an electric motor vehicle drive unit with a pressure compensation module accommodated therein; and, FIG. 2 shows a schematic of an electric motor vehicle drive unit with a pressure compensation module arranged on the outside thereof.

FIG. 1 illustrates a highly simplified motor vehicle drive unit. In the motor vehicle drive housing 14, the electric drive machine (not illustrated) is arranged in the electric motor housing interior space (EMA) and the traction transmission (not illustrated) is arranged in the traction transmission interior space (GBX). Between the two partial spaces (EMA, GBX) of the motor vehicle drive housing 14, it is possible during operation for pressure differences to arise which have to be equalized as much as possible, without media being able to pass from one into the other of these partial spaces.

This pressure equalization is made possible by the pressure compensation module disclosed herein. The pressure compensation module has the first pressure chamber 1 and the second pressure chamber 2. The first displacement device 3, which is designed as an expansion bellows device, is arranged in the first pressure chamber 1. The second pressure chamber 2 has the second displacement device 4, which is likewise designed as an expansion bellows device. The first displacement device 3 has the first displacement interior volume 5, or the latter is enclosed in the first displacement device 3. Furthermore, the second displacement interior volume 6 is enclosed in the second displacement device 4.

The intermediate space in the first pressure chamber 1 between the latter and the first displacement device 3 can be considered to be a first compensation volume 7. In an operating state in which the pressure in this first compensation volume 7 is lower than the pressure in the first displacement interior volume 5, the first displacement device 3 functionally expands until pressure is compensated for again or the first displacement device 3 is not capable of expanding further. The intermediate space in the second pressure chamber 2 between the latter and the second displacement device 4 can be considered to be a second compensation volume 8. In an operating state in which the pressure in this second compensation volume 8 is lower than the pressure in the second displacement interior volume 6, the second displacement device 4 functionally expands until pressure is compensated for again or the second displacement device 4 is not capable of expanding further.

The first pressure chamber 1 is connected in a fluid-conducting manner via the first compensation connection 9 to the electric motor housing interior space EMA. The first displacement interior volume 5 is connected in a fluid-conducting manner via the first interior volume connection 11 to the traction transmission interior space GBX, this connection taking place via the second pressure chamber 2 and the second compensation connection 10. The second pressure chamber 2 is connected in a fluid-conducting manner via the second compensation connection 10 to the traction transmission interior space GBX. The second displacement interior volume 6 is connected in a fluid-conducting manner via the second interior volume connection 12 to the electric motor housing interior space EMA, this connection taking place via the first pressure chamber 1 and the first compensation connection 9.

With the described interconnection of the first and second displacement devices 3, 4 and the first and second pressure chambers 1, 2 to the traction transmission interior space GBX and to the electric motor housing interior space EMA, pressure can be compensated between these two partial spaces (EMA, GBX) without them being connected in a fluid-conducting manner to each other. In the illustrated embodiment of the disclosure, the pressure compensation module with the two pressure chambers 1, 2 is completely accommodated in the motor vehicle drive housing and thus permits a space-saving construction.

Figure 2:
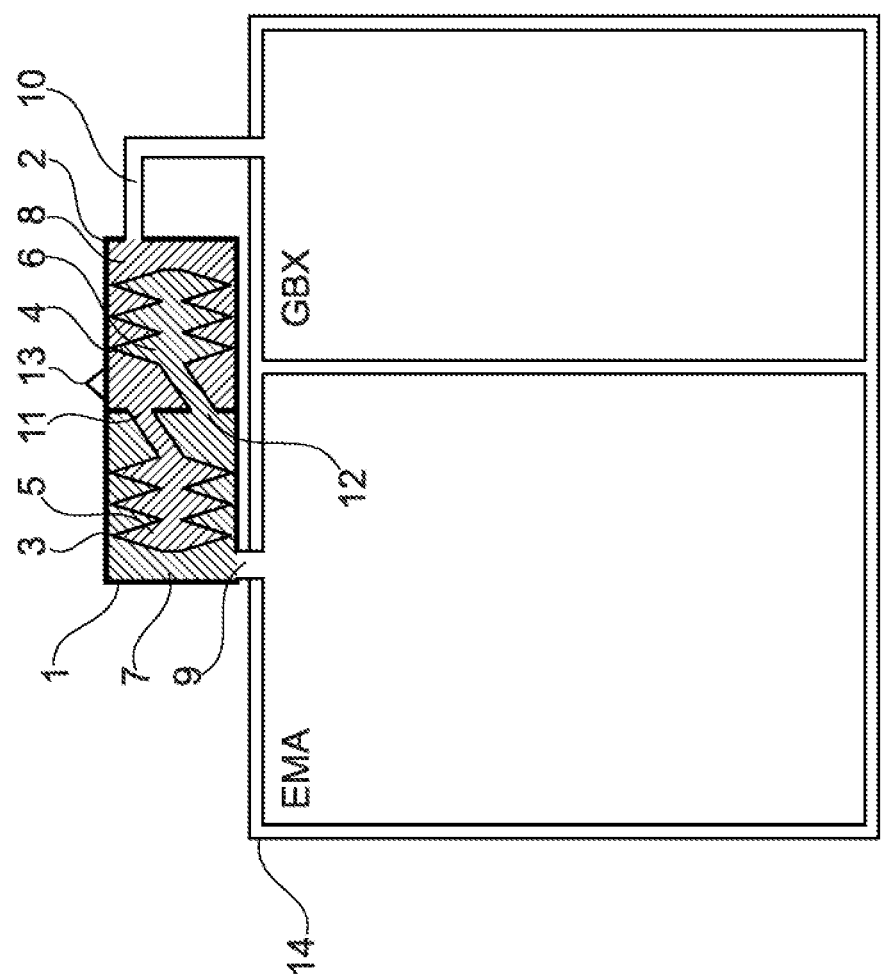

FIG. 2 illustrates a greatly simplified motor vehicle drive unit which comprises an embodiment of the disclosure modified in relation to the embodiment illustrated in FIG. 1. In the motor vehicle drive housing 14, the electric drive machine (not illustrated) is arranged in the electric motor housing interior space (EMA) and the traction transmission (not illustrated) is arranged in the traction transmission interior space (GBX). Between the two partial spaces (EMA, GBX) of the motor vehicle drive housing 14, it is possible during operation for pressure differences to arise which should be equalized as far as possible without media being able to pass from one into the other of these partial spaces (EMA, GBX).

This pressure equalization is made possible by the proposed pressure compensation module which, in a departure from the previously described embodiment, is arranged on the outside of the motor vehicle drive unit. However, as before, the pressure compensation module has the first pressure chamber 1 and the second pressure chamber 2. The first displacement device 3, which is designed as an expansion bellows device, is arranged in the first pressure chamber 1. The second pressure chamber 2 has the second displacement device 4, which is likewise designed as an expansion bellows device. The first displacement device 3 has the first displacement interior volume 5, or the latter is enclosed in the first displacement device 3. Furthermore, the second displacement interior volume 6 is enclosed in the second displacement device 4.

The intermediate space in the first pressure chamber 1 between the latter and the first displacement device 3 can be considered to be a first compensation volume 7. In an operating state in which the pressure in this first compensation volume 7 is lower than the pressure in the first displacement interior volume 5, the first displacement device 3 functionally expands until pressure is compensated for again or the first displacement device 3 is not capable of expanding further. The intermediate space in the second pressure chamber 2 between the latter and the second displacement device 4 can be considered to be a second compensation volume 8. In an operating state in which the pressure in this second compensation volume 8 is lower than the pressure in the second displacement interior volume 6, the second displacement device 4 functionally expands until pressure is compensated for again or the second displacement device 4 is not capable of expanding further.

The first pressure chamber 1 is connected in a fluid-conducting manner via the first compensation connection 9 to the electric motor housing interior space EMA. The first displacement interior volume 5 is connected in a fluid-conducting manner via the first interior volume connection 11 to the traction transmission interior space GBX, this connection taking place via the second pressure chamber 2 and the second compensation connection 10. The second pressure chamber 2 is connected in a fluid-conducting manner via the second compensation connection 10 to the traction transmission interior space GBX. The second displacement interior volume 6 is connected in a fluid-conducting manner via the second interior volume connection 12 to the electric motor housing interior space EMA, this connection taking place via the first pressure chamber 1 and the first compensation connection 9.

With the described interconnection of the first and second displacement devices 3, 4 and the first and second pressure chambers 1, 2 to the traction transmission interior space GBX and to the electric motor housing interior space EMA, pressure can be compensated between these two partial spaces (EMA, GBX) without them being connected in a fluid-conducting manner to each other. Furthermore, the pressure compensation module has a ventilator device 13 which ventilates the traction transmission interior space GBX to the environment.

Furthermore, an embodiment is proposed which can be substantially designed in the same way as the embodiment illustrated in FIG. 2. This additional embodiment (not illustrated) of the disclosure can be understood as meaning an "integrated" embodiment since this embodiment combines a plurality of functions in one apparatus. That is, in the integrated pressure compensation module, ventilation and pressure compensation functions for the motor vehicle drive unit are combined. These functions are in particular a pressure compensation function between the electric motor housing interior space and the traction transmission interior space, and a ventilation function for at least one of these spaces (traction transmission interior space, electric machine housing interior space) or both.

In particular in order to produce at least one of the ventilation functions mentioned, at least one ventilation element can be accommodated in the integrated pressure compensation module described above. This ventilation element is preferably configured as what is referred to as an IPX7 transmission ventilator, or is preferably configured as a standard transmission ventilator. Furthermore, a construction of the pressure compensation module adapted in particular to spatial requirements, in particular by a modular construction thereof, is made possible. Furthermore, preferably, at least one line for conducting a media flow is accommodated in a housing wall of the pressure compensation module, or this line is formed integrally in the housing wall. An integrated pressure compensation module in particular makes it possible to produce the necessary functions in a small installation space.

List of reference signs:

| | |
|---|---|
| 1 | first pressure chamber |
| 2 | second pressure chamber |
| 3 | first displacement device |
| 4 | second displacement device |
| 5 | first displacement interior volume |
| 6 | second displacement interior volume |
| 7 | first compensation volume |
| 8 | second compensation volume |
| 9 | first compensation connection |
| 10 | second compensation connection |
| 11 | first interior volume connection |
| 12 | second interior volume connection |
| 13 | ventilator device |
| 14 | motor vehicle drive housing |
| EMA | electric motor housing interior space |
| GBX | traction transmission interior space |

What is claimed is:

1. A pressure compensation module comprising:
   a first pressure chamber in which a first displacement device having a first displacement interior volume is arranged, and
   a second pressure chamber in which a second displacement device having a second displacement interior volume is arranged,
   wherein an intermediate space between the first pressure chamber and the first displacement device forms a first compensation volume,
   wherein an intermediate space between the second pressure chamber and the second displacement device forms a second compensation volume,
   wherein the first compensation volume is connected in a fluid-conducting manner by a first compensation connection to an environment surrounding the first pressure chamber,
   wherein the second compensation volume is connected in a fluid-conducting manner by a second compensation connection to an environment surrounding the second pressure chamber,
   wherein the first displacement interior volume is connected in a fluid-conducting manner by a first interior volume connection to the second compensation volume, and
   wherein the second displacement interior volume is connected in a fluid-conducting manner by a second interior volume connection to the first compensation volume.

2. The pressure compensation module according to claim 1, wherein at least one of the two displacement devices comprise an expansion bellows in which the displacement interior volume is located.

3. The pressure compensation module according to claim 1, wherein at least one of the two displacement devices comprise an expandable reservoir bladder in which the displacement interior volume is located.

4. The pressure compensation module according to claim 1, further comprising a ventilator device, wherein at least one of the two compensation volumes is connected in a fluid-conducting manner by way of the ventilator device to the environment surrounding the pressure compensation module.

5. A motor vehicle drive unit comprising:
   an electric drive machine arranged in an electric motor housing interior space (EMA),
   a traction transmission arranged in a traction transmission interior space (GBX), and
   a pressure compensation module according to claim 1,
   wherein the first compensation volume is connected in a fluid-conducting manner to the electric motor housing interior space (EMA),
   wherein the second compensation volume is connected in a fluid-conducting manner to the traction transmission interior space (GBX).

6. The motor vehicle drive unit according to claim 5, wherein the pressure compensation module is arranged at least partially or completely in the traction transmission interior space (GBX), or in the electric motor housing interior space (EMA), or in both.

7. The motor vehicle drive unit according to claim 5, wherein the pressure compensation module is arranged completely outside the traction transmission interior space (GBX) and the electric motor housing interior space (EMA).

* * * * *